US011966981B2

(12) United States Patent
Liu et al.

(10) Patent No.: US 11,966,981 B2
(45) Date of Patent: Apr. 23, 2024

(54) METHOD AND APPARATUS FOR ASSESSING AN INSURED LOSS, COMPUTER DEVICE, AND STORAGE MEDIUM

(71) Applicant: SHENZHEN JU FENG TECHNOLOGY COMPANY, Shenzhen (CN)

(72) Inventors: Kun Liu, Shenzhen (CN); Xiaoqing Wu, Shenzhen (CN)

(73) Assignee: SHENZHEN JU FENG TECHNOLOGY COMPANY, Shenzhen (CN)

(*) Notice: Subject to any disclaimer, the term of this patent is extended or adjusted under 35 U.S.C. 154(b) by 284 days.

(21) Appl. No.: 17/537,349

(22) Filed: Nov. 29, 2021

(65) Prior Publication Data

US 2022/0084132 A1    Mar. 17, 2022

Related U.S. Application Data

(63) Continuation of application No. PCT/CN2020/093389, filed on May 29, 2020.

(30) Foreign Application Priority Data

May 30, 2019    (CN) .......................... 201910462715.1

(51) Int. Cl.
*G06Q 40/00* (2023.01)
*B64C 39/02* (2023.01)
(Continued)

(52) U.S. Cl.
CPC ........... *G06Q 40/08* (2013.01); *B64C 39/024* (2013.01); *G06V 10/44* (2022.01);
(Continued)

(58) Field of Classification Search
CPC ...... G06Q 40/08; B64C 39/024; G06V 10/44; G06V 10/7747; G06V 10/776; G06V 20/17; G06V 20/176; B64U 2101/30
(Continued)

(56) References Cited

U.S. PATENT DOCUMENTS 9,129,355 B1 * 9/2015 Harvey .................. G06V 10/44
9,152,863 B1 * 10/2015 Grant ..................... G06Q 10/20
(Continued)

FOREIGN PATENT DOCUMENTS

CN    108491821 A    9/2018
CN    108921068 A    11/2018
CN    109344819 A    2/2019

OTHER PUBLICATIONS

Information Extraction From Remote Sensing Images for Flood Monitoring and Damage Evaluation; Proceedings of the IEEE (vol. 100, Issue: 10, pp. 2946-2970); Sebastiano B. Serpico, Silvana Dellepiane, Giorgio Boni, Gabriele Moser, Elena Angiati, Roberto Rudari; Aug. 2, 2012. (Year: 2012).*
(Continued)

*Primary Examiner* — Tien C Nguyen

(57) ABSTRACT

Provided is a method and apparatus for assessing an insured loss, a computer device, and a storage medium. The method includes: S1: building up a database, and conducting model training on big data using a deep learning model or machine learning model to improve a recognition effect; S2: capturing a photo of a roof of a house to be assessed for damage according to needs, and transmitting collected image data to a background; S3: automatically recognizing the image data by the background according to needs, and feeding back a recognition result; S4: marking out a damage point, a suspected damage point, and a non-damage point according to the recognition result; and S5: formulating a loss assessment report using the marked results according to needs. The
(Continued)

apparatus, computer device, and storage medium each correspond to the above method.

16 Claims, 4 Drawing Sheets

(51) Int. Cl.
    *G06Q 40/08*       (2012.01)
    *G06V 10/44*       (2022.01)
    *G06V 10/774*     (2022.01)
    *G06V 10/776*     (2022.01)
    *G06V 20/10*       (2022.01)
    *G06V 20/17*       (2022.01)

(52) U.S. Cl.
    CPC ........ *G06V 10/7747* (2022.01); *G06V 10/776* (2022.01); *G06V 20/17* (2022.01); *G06V 20/176* (2022.01)

(58) Field of Classification Search
    USPC .......... 705/4, 5, 39, 37, 38, 40, 26; 235/380, 235/370; 244/76 R; 701/2; 703/6; 348/47, 144; 709/224; 707/769
    See application file for complete search history.

(56) References Cited

U.S. PATENT DOCUMENTS

| | | | | |
|---|---|---|---|---|
| 9,609,288 B1* | 3/2017 | Richman | ............... | G06F 18/214 |
| 10,635,903 B1* | 4/2020 | Harvey | ................. | G06T 7/0002 |
| 10,832,476 B1* | 11/2020 | Nussbaum | ............. | G06V 20/20 |
| 2014/0267627 A1* | 9/2014 | Freeman | ............... | H04N 13/275 348/47 |
| 2014/0324405 A1* | 10/2014 | Plummer | .............. | G06T 7/0004 703/6 |
| 2015/0325064 A1* | 11/2015 | Downey | .............. | G08G 5/0039 701/29.3 |
| 2015/0343644 A1* | 12/2015 | Slawinski | .............. | B62D 55/10 701/2 |
| 2015/0377405 A1* | 12/2015 | Down | ................... | B64C 39/024 244/76 R |
| 2016/0176542 A1* | 6/2016 | Wilkins | ............... | H04N 23/661 348/144 |
| 2017/0270612 A1* | 9/2017 | Howe | .................. | G06V 20/176 |
| 2018/0182039 A1 | 6/2018 | Wang et al. | | |
| 2019/0114717 A1* | 4/2019 | Labrie | .................... | G06Q 40/08 |

OTHER PUBLICATIONS

Unmanned Aircraft Systems (UAS) research and future analysis; 2014 IEEE Aerospace Conference (pp. 1-16); Chris A. Wargo, Gary C. Church, Jason Glaneueski, Mark Strout; Mar. 1, 2014. (Year: 2014).*

International Search Report issued in corresponding International application No. PCT/CN2020/093389, dated Aug. 26, 2020.

Written Opinion of the International Searching Authority for No. PCT/CN2020/093389.

* cited by examiner

METHOD AND APPARATUS FOR ASSESSING AN INSURED LOSS, COMPUTER DEVICE, AND STORAGE MEDIUM

CROSS-REFERENCE TO RELATED APPLICATIONS

This application is a U.S. continuation of co-pending International Patent Application Number PCT/CN2020/093389, filed on May 29, 2020, which claims the priority of Chinese Patent Application Number 201910462715.1, filed on May 30, 2019 with China National Intellectual Property Administration, the disclosures of which are incorporated herein by reference in their entireties.

TECHNICAL FIELD

This disclosure relates to the technical field of information processing, and more particularly relates to a method and apparatus for assessing an insured loss, a computer device, and a storage medium.

BACKGROUND

The damage caused by hail and high winds (including hurricanes, typhoons, tornadoes, etc.) on the roofs of houses has always been tricky and costly in the context of insurance claims. The damage caused by hail on a roof is mostly semi-circular or crescent-shaped, and its color and shape presented on different roofing materials are also quite different. It can be easily confused with the damage caused by a blister that is formed due to high temperatures and ruptures on asphalt roofing materials. In the past claims process, whether the photos are taken with a camera or the camera that comes with a mobile phone, only a small portion of the damages caused by the hail on the roof can be clearly identified. Damage caused by high winds generally appears as missing tiles or misalignment of tiles. The human eye can quickly recognize the damage from the photo, even if the photo is not clear enough. However, the recognition of such damage by machine is not satisfactory, especially when the photo is not clear enough. With the promotion and application of drone photography in the insurance industry, the high definition drone photos provides the possibility of automatically identifying hail and wind damage, while machine learning and deep learning provide the necessary methods and tools.

At present, the industry typically needs to rely on an experienced claims adjuster to mark out the damaged tiles on the roof with chalk or other tools through on-site surveys, and find a certain number of damage points within an area to determine whether the claim meets the requirements. In contrast, a recognition system automatically recognizes damaged tiles based on photos captured by a drone, and then projects the detected damage onto the roof for global assessment. This technology eliminates the need for the claims adjuster to climb onto the roof and walk back and forth on the roof for 30-75 minutes to find the damage points one by one. It also avoids misjudgments caused by human factors.

In terms of the application of drone photography in the insurance industry, Loveland Innovation LLC and Kespry in the United States are recognized as leading companies in the industry. However, the solutions they provide for damage recognition still rely on the users themselves to confirm and modify the results given by the machine. The accuracy of the results given by the machine is less than 50%, and the accuracy will be significantly reduced on an old roof. Moreover, the modification tools they provide users are not convenient enough. Users need to enter and exit the picture modification interface and picture preview interface multiple times to complete the modification of a picture. Therefore, this disclosure is mainly aimed at high-precision automatic identification. Of course, even in the case of high precision, there may be cases of misidentification.

SUMMARY

In view of the above problems, this disclosure aims to provide a method and apparatus for assessing an insured loss, a computer device, and a storage medium.

In order to solve the above technical problems, a technical solution adopted by this disclosure is to provide a method for assessing an insured loss, which includes the following operations:

S1: building up a database, and conducting model training on big data using a deep learning model or machine learning model to improve a recognition effect;

S2: collecting a photo of a roof of a house to be assessed for damage according to needs, and transmit the collected image data to a background;

S3: automatically recognizing the image data by the background according to needs, and feeding back a recognition result;

S4: marking out a damage point, a suspected damage point, and a non-damage points according to the recognition result; and S5: formulating a loss assessment report using the marked results to according to needs.

Further, the operation S2 may include:

S21: determining whether a data collection target is global data collection or detailed data collection according to needs;

S22: in response to determining that the data collection target is global data collection, controlling a drone to fly at a relatively high altitude, collect global image data, and feed it back to the background; and S23. in response to determining that the data collection target is detailed data collection, controlling the drone to fly at a relatively low altitude, collect detailed image data, and feed it back to the background.

Further, the operation S3 may include:

S31: determining whether a recognition type is global recognition or detailed recognition according to the needs of operation S2 and the collected image data;

S32: in response to determining that the recognition type is global recognition, making a preliminary judgment based on the global image data whether there is damage, and if there is a damage, determining that the house needs to be assessed for damage, and returning to operation S2 for detailed data collection; otherwise if there is no damage, ending the loss assessment; and S33: in response to determining that the recognition type is the detail recognition, performing classification training on the damage points according to the detailed image data, weighting the classification training results, and ranking according to the accuracy of the automatic recognition.

As an improvement, the operation S4 may include:

S41: adding or deleting a damage mark on a damage point by a user according to his own judgment according to the recognition results, where the mark of the damage type includes hail damage, wind damage, mechanical damage, and various ageing and wearing damages.

As a further improvement, the operation S4 may further include:

S42: adding a screenshot for each damage point; when the marking is completed, automatically taking screenshots of all the damages while saving the marks, and automatically select multiple screenshots according to the matching degree between the type of damage and the type of claim; if other screenshots are still needed to be added, manually using the screenshot tool to take screenshots and add them by the user.

As a further improvement, the operation S4 may further include:

S43: virtual test box function, where for a damage claim, the insurance company's standard for claim settlement is to check whether there is more damage points than a preset value in a preset area, and according to the measurements, the virtual test box function is given in a complete loss report, where the number of damage points in the box is marked out.

There is further provided a system for assessing an insured loss, the system including:

an unmanned aerial vehicle configured to capture a photo of a roof of a house that is to be assessed for damage according to needs, and transmit the collected image data to a background; and the background, which is configured to first build up a database, perform model training on big data using a deep learning model or a machine learning model to improve a recognition effect, then automatically recognize the image data according to needs, and feed back a recognition result, and then mark out a damage point, a suspected damage point, and a non-damage points according to the recognition results, and finally form a loss assessment report using the marked results according to needs.

There is further provided a computer device that includes a memory and a processor, the memory storing a computer program, which when executed by the processor causes the operations of any one of the above methods to be performed.

There is further provided a computer-readable storage medium having a computer program stored therein, which when executed by a processor causes the operations of any one of the above-mentioned methods to be performed.

According to the method and apparatus for assessing an insurance loss, the computer device, and the storage medium provided by this disclosure, by constructing a damage artificial intelligence model and algorithm, high-precision recognition by the machine is realized. Furthermore, the automatic damage recognition process is standardized and simplified, which greatly reduces the processing cycle and the required manpower. In the case of errors or omissions, a complete and easy-to-use set of identification tools is designed, and an automatic screenshot function is innovatively added to it, allowing the user to easily modify a damage, and after correcting the damage, the user only needs to click save thus completing the picture modification and automatically putting the screenshots into the report. As a result, the loss assessment cycle has been reduced from a few hours in the current common schemes to a few minutes, which greatly shortens the time for making reports, improves the work efficiency of claims adjusters, and saves insurance companies' claims settlement costs.

DETAILED DESCRIPTION

For a better understanding of the objectives, technical solutions, and advantages of the present application, hereinafter the present application will be described in further detail in connection with the accompanying drawings and some illustrative embodiments. It is to be understood that the specific embodiments described here are intended for mere purposes of illustrating this application, rather than limiting.

Hereinafter, the method and apparatus for assessing an insured loss (also interchangeably referred to as loss assessment method and apparatus for sake of brevity), the computer device, and the storage medium provided by the present disclosure will be illustrated in detail in connection with FIGS. 1-9.

The user first needs to decide to choose a real-time loss assessment report or a complete loss assessment report, where the main difference lies in that whether it is combined with the measurement results. If the user chooses the real-time damage report, then after the drone achieves the automatic flight and automatically uploads the picture, the system will automatically run the damage detection algorithm to identify the damage caused by hail or strong wind, and mark it on the picture. The real-time loss assessment report will be completed within 1-3 minutes after the picture is uploaded and submitted directly to the user.

If the user chooses the complete loss assessment, the drone will automatically capture a more comprehensive set of images and automatically upload the images to the platform. When receiving the picture, the system will launch a three-dimensional measurement and calculation and automatic damage identification algorithm at the same time. After the three-dimensional measurement result is completed, the identified damage will be automatically projected onto the overview map of the roof, so that the degree of damage can be further evaluated to ascertain whether it meets the insurance company's claim settlement conditions.

Figure 1:
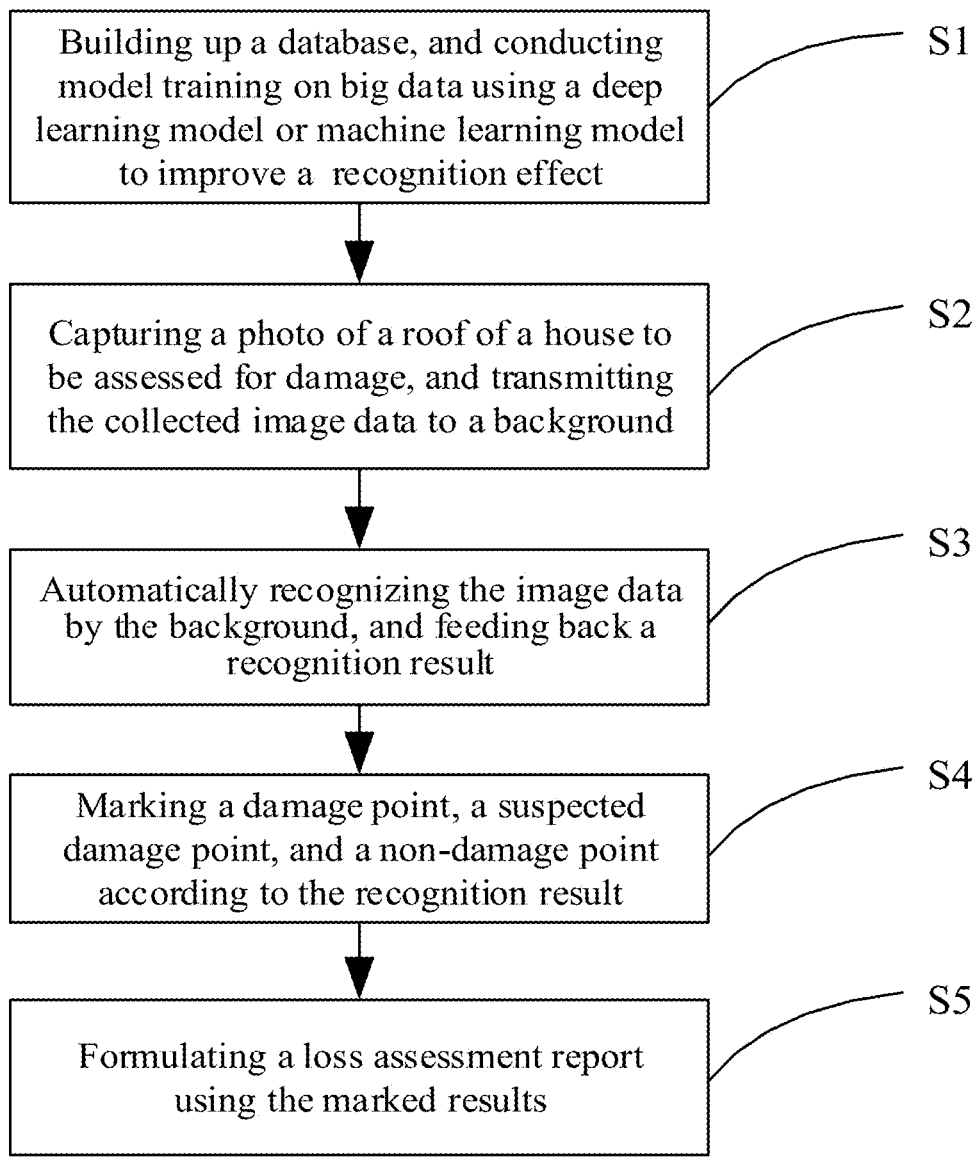
FIG. 1 is a flowchart of a method for assessing an insured loss according to the present disclosure.

After determining the required report type, the loss assessment is started. As illustrated in FIG. 1, the present disclosure provides an insurance loss assessment method, which includes the following operations:

S1: build up a database, and conduct model training on big data through a deep learning model or machine learning model to improve the recognition effect;

S2: collect photos of a roof of a house that is to be assessed for damage according to needs, and transmit the collected image data to the background;

S3: the background automatically recognizes the image data according to needs, and feeds back the recognition result;

S4: mark the damage points, suspected damage points, and non-damage points according to the recognition results; and S5: use the marked results to formulate a loss assessment report according to needs.

This disclosure provides an insurance loss assessment method that allows users to choose different flight modes and loss assessment modes depending on their own needs, which greatly improves efficiency and reduces costs. In the assessment of damage, human interference factors and the limitation of experience are eliminated to the greatest extent, and the consistency of the assessment of damage is also a revolutionary breakthrough. For insurance, a high degree of consistency and minimal human interference are the most important criteria in the claims settlement process. This embodiment can meet these two requirements of insurance companies at the same time.

In terms of establishing a usable damage recognition model, using the ready-made deep learning model or machine learning model cannot achieve this goal. The main reason is that the characteristics of hail and wind damages are very different from most of the image data that can be collected in life. And before UAVs were commonly used, the quality of most photos could not meet the requirements of model training. After a period of exploration and trials of various deep learning models and machine learning models, according to this embodiment enough data is first collected for model training, before further improving the algorithm of the model.

After 9 months of data collection, the drone data of nearly 5,000 sets of houses of different types is collected in this embodiment, and the acquired data is then processed, selected, and labeled.

As an exemplary embodiment, the operation S2 may include:

S21: determine whether the data collection target is global data collection or detailed data collection according to needs;

S22: if it is global data collection, control the drone to fly at a high altitude, collect global image data, and feed it back to the background; and S23: if it is detailed data collection, control the drone to fly at a low altitude, collect detailed image data, and feed it back to the background.

As another exemplary embodiment, the operation S3 may include:

S31: determine whether the recognition type is global recognition or detailed recognition according to the requirements of operation S2 and the collected image data;

S32: if it is global recognition, make a preliminary judgment based on the global image data whether there is damage, and if there is a damage, it is determined that the building needs to be assessed for damage, and return to operation S2 for detailed data collection; otherwise if there is no damage, end the loss assessment; and S33: if it is the detail recognition, perform classification training on the damage points according to the detailed image data, weight the classification training results, and rank according to the accuracy of the automatic recognition.

Figure 2:
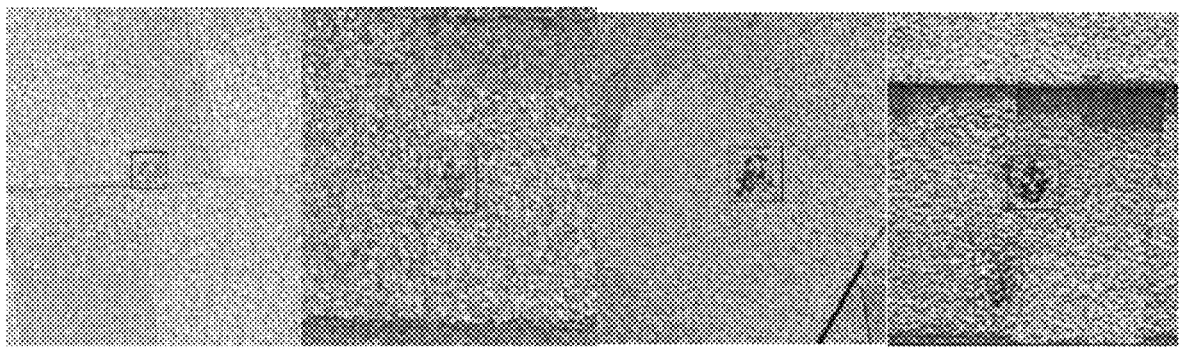
FIG. 2 is an illustration of a damage point.
Figure 3:
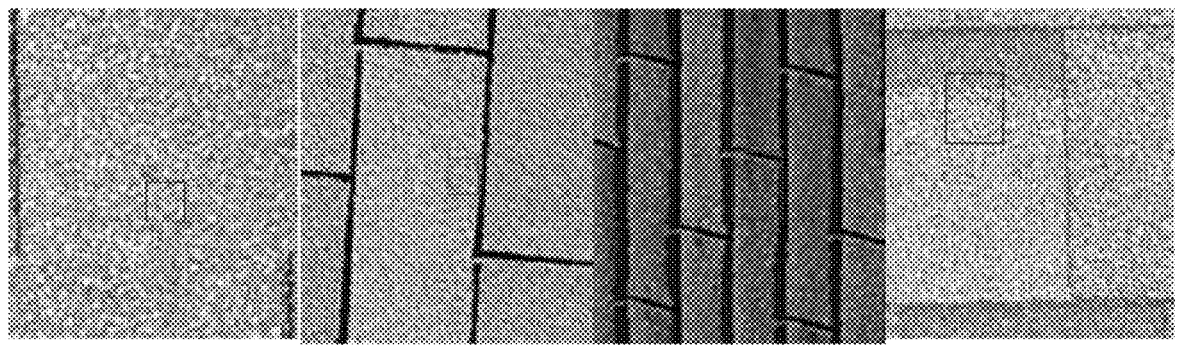
FIG. 3 is an illustration of a suspected damage point.
Figure 4:
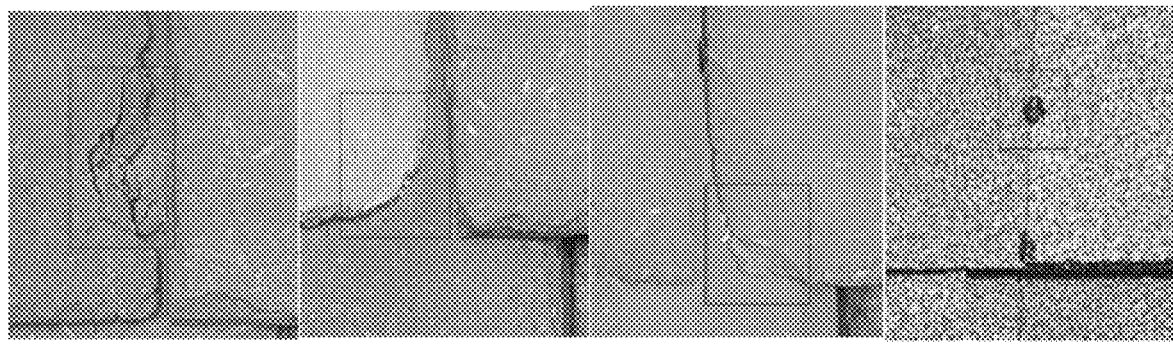
FIG. 4 is an illustration of a non-damage point.
Figure 5:
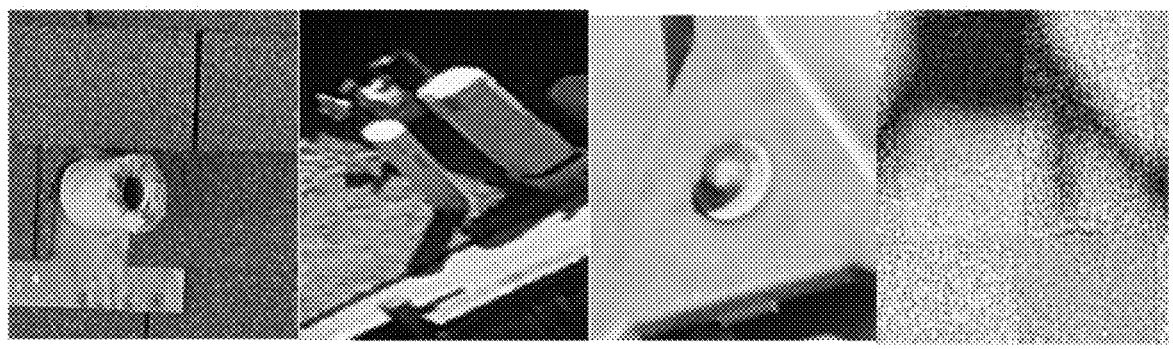
FIG. 5 is an illustration of a non-damage point.
Figure 6:
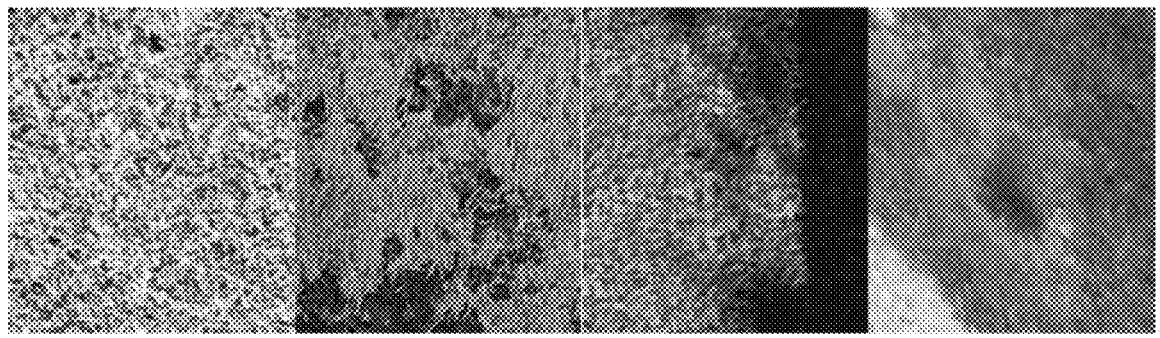
FIG. 6 is an illustration of a non-damage point.

First, identify the damaged area from all available data pictures, so that the labeling box can just cover the damaged area. FIG. 2 shows some such available data pictures. FIG. 3 illustrates some ambiguous data points. Due to various factors, including weather, light and angle, the ambiguous data points account for 70% of the overall data. Therefore, in the iterative process, this embodiment continuously collects new data and continuously labels new data. At present, there are data of nearly 12,000 houses on the platform, and nearly 100,000 valid data points have been extracted for model training. This embodiment also marks non-hail damages. For deep learning algorithms, both hail damages and non-hail damages are critical to the improvement of the accuracy of the model. FIGS. 4-6 illustrate the labeling of non-hail damage and the labeling of irrelevant objects, which are all necessary elements for the training of the model.

After summarizing all the data points (the first 5000 houses), we made a preliminary statistical table, as shown in the following Table 1.

TABLE 1

| Detection | Picture Type | Picture Size | Sum |
|---|---|---|---|
| Categories | Hail damage | 224*224 | 9500 |
| | Real damage | 300*300 | 1400 |
| | Roof tile black spot | 300*300 | 2800 |
| | Roof sundries | 300*300 | 4500 |
| | Roof tile pattern | 300*300 | 8000 |
| | Roof shadow | 300*300 | 800 |
| | Trees, grass, etc. | 300*300 | 7000 |

In the model training process, it is found that the recognition effect of a single model is not sufficient to achieve an accuracy higher than 90%. Therefore, in this embodiment, multiple classification models are selected at the same time for training and classification, and then the classification results are weighted and sorted, so as to select the most confident 5-10 damage points of the model and mark them on the original photos obtained by the drone. This leads to greatly improved effects. Model selection considers detection accuracy and speed. The main training direction is to increase the fit between the data and the model and minimize the generalization error. At the same time, the integration of detection models of different scales, and the cascade of detection models and classification models are adopted to increase the recall rate, so that the detected hail damage is highly likely to be a real hail damage.

Figure 7:
FIG. 7 is an illustration of a damage marking page.

As illustrated in FIG. 7, as another exemplary embodiment, the operation S4 includes the following:

S41: the user adds or deletes the damage mark on a damage point according to his own judgment according to the recognition results, where the mark of the damage type includes hail damage, wind damage, mechanical damage, and various ageing and wearing damage.

Figure 8:
FIG. 8 is an illustration of an automatic screenshot function page.

As illustrated in FIG. 8, as another exemplary embodiment, the operation S4 may further include the following:

S42: add a screenshot for each damage point; when the marking is completed, automatically take screenshots of all the damages while saving the markings, and automatically select multiple screenshots, typically 8 screenshots, according to the matching degree between the type of damage and the type of claim; if other screenshots are still needed to be added, the user can manually use the screenshot tool to take screenshots and add them.

Figure 9:
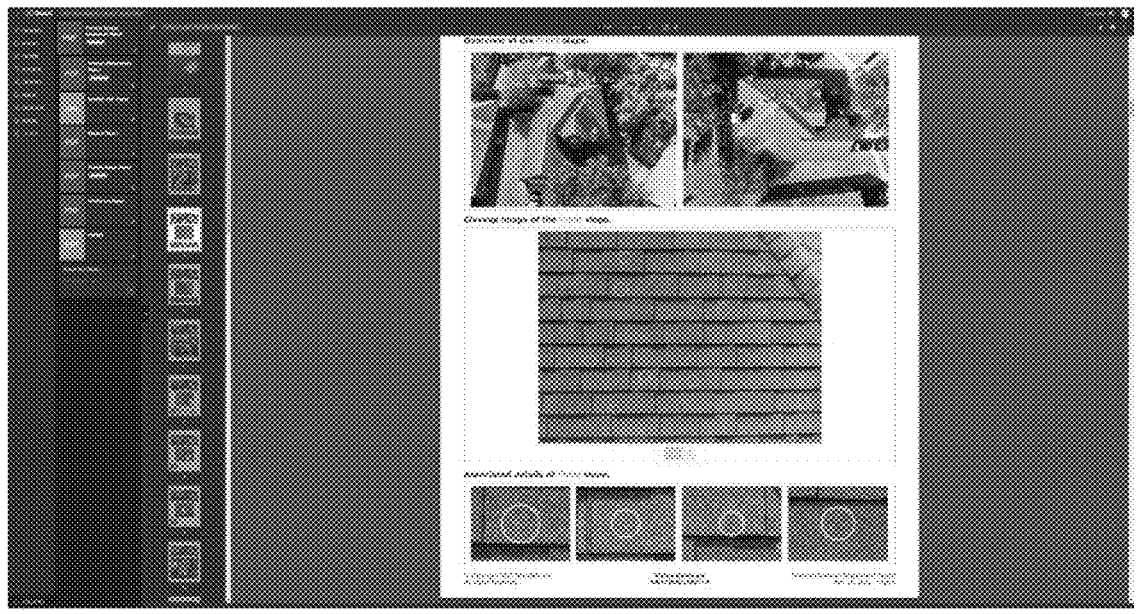
FIG. 9 is an illustration of a virtual test box function page.

As illustrated in FIG. 9, as another exemplary embodiment, the operation S4 may further include the following:

S43: virtual test box function, where for a damage claim, the insurance company's standard for claim settlement is to see whether there is more damage points than a preset value (typically 8 or 10) in a preset area, and according to the measurement results, in this embodiment the virtual test box function is given in a complete loss report, and the number of damage points in the box is marked.

There is further provided a system for assessing an insured loss, the system including:
an unmanned aerial vehicle configured to capture a photo of a roof of a house that is to be assessed for damage according to needs, and transmit the collected image data to a background; and
the background, which first builds up a database, and performs model training on big data through a deep learning model or a machine learning model to improve the recognition effect, then automatically recognizes the image data according to needs, and feeds back the recognition result, and then marks the damage points, the suspected damage points, and the non-damage points according to the recognition results, and finally uses the marking results to form a loss assessment report according to needs.

There is further provided a computer device that includes a memory and a processor, the memory storing a computer program, which when executed by the processor causes the operations of any one of the above methods to be performed.

There is further provided a computer-readable storage medium having a computer program stored therein, which when executed by a processor causes the operations of any one of the above-mentioned methods to be performed.

According to the method and apparatus for assessing an insurance loss, the computer device, and the storage medium provided by this disclosure, by constructing a damage artificial intelligence model and algorithm, high-precision recognition by the machine is realized. At the same time, the automatic damage recognition process is standardized and simplified, which greatly reduces the processing cycle and the required manpower. In the case of errors or omissions, a complete and easy-to-use set of identification tools is designed, and an automatic screenshot function is innovatively added to it, allowing the user to easily modify a damage, and after correcting the damage, the user only needs to click save thus completing the picture modification and automatically putting the screenshots into the report. As a result, the loss assessment cycle has been reduced from a few hours in the prevailing schemes to a few minutes, which greatly shortens the time for making reports, improves the work efficiency of claims adjusters, and saves insurance companies' claims settlement costs.

Embodiments of this application conducted data collection, labelling, and proofreading in the United States for a continuous period of 9 months, carefully deleted and selected from more than 100,000 photos, and built our own deep learning architecture from the bottom up, which basically achieves real-time high-precision recognition, and has attained recognition by American insurance companies.

The foregoing merely portrays some illustrative embodiments of the present disclosure. It should be noted that those of ordinary skill in the art will be able to make multiple improvements and modifications without departing from the principle of this disclosure, and these improvements and modifications should all be regarded as falling in the scope of protection of this disclosure.

What is claimed is:

1. A method of assessing an insured loss, comprising:
S1: building up a database, and conducting model training on big data using a deep learning model or machine learning model to improve a recognition effect;
S2: capturing a photo of a roof of a house to be assessed for damage using an unmanned aerial vehicle, and transmitting, by the unmanned aerial vehicle, collected image data to a background;
S3: automatically recognizing the image data by the deep learning model or machine learning model running on the background, and feeding back, by the deep learning model or the machine learning model, a recognition result;
S4: automatically marking out, by the background, a damage point, a suspected damage point, and a non-damage point according to the recognition result; and
S5: formulating a loss assessment report using the marked results;
wherein the operation S2 comprises:
S21: determining whether a data collection target is global data collection or detailed data collection according to needs;
S22: in response to determining that the data collection target is the global data collection, controlling the unmanned aerial vehicle to fly at a relatively high altitude, collect global image data, and feed it back to the background; and
S23: in response to determining that the data collection target is the detailed data collection, controlling the unmanned aerial vehicle to fly at a relatively low altitude, collect detailed image data, and feed it back to the background.

2. The method of claim 1, wherein the operation S3 comprises:
S31: determining whether a recognition type is global recognition or detailed recognition according to the needs of operation S2 and the collected image data;
S32: in response to determining that the recognition type is the global recognition, making a preliminary judgment based on the global image data whether there is a damage, and in response to determining that there is a damage, determining that the housed needs to be assessed for damage, and returning to operation S2 for detailed data collection; otherwise in response to determining that there is no damage, ending the loss assessment; and
S33: in response to determining that the recognition type is the detail recognition, performing classification training on the damage points according to the detailed image data, weighting classification training results, and ranking according to an accuracy of automatic recognition.

3. The method of claim 2, wherein the operation S4 comprises:
S41: adding or deleting a damage mark on a damage point by a user according to the user's own judgment according to the recognition results, wherein the mark of the damage type comprises hail damage, wind damage, mechanical damage, and a plurality of aging and wearing damages.

4. The method of claim 2, wherein the operation S4 further comprises:
S42: adding a screenshot for each damage point, when the marks are completed, automatically taking screenshots of all damages while saving the marks, and automatically selecting a plurality of screenshots according to a matching degree between a type of damage and a type of claim; if another screenshot is still needed to be added, using a screenshot tool to manually take a screenshot and adding it by the user.

5. The method of claim 2, wherein the operation S4 further comprises:
S43: a virtual test box function, in which an insurance company's standard for settlement of a claim comprises checking whether there are more damage points than a preset value within a preset area, and according to measurements the virtual test box function is provided in a complete loss report, where the number of damage points in the box is marked.

6. A system for assessing an insured loss, comprising:

an unmanned aerial vehicle, configured to capture a photo of a roof of a house to be assessed for damage, and transmit collected image data to a background; and the background, configured to first build up a database, and perform model training on big data using a deep learning model or a machine learning model to improve a recognition effect, automatically recognize the image data through the deep learning model or machine learning model, and feed back a recognition result by the deep learning model or machine learning model, and then automatically mark out a damage point, a suspected damage point, and a non-damage points according to the recognition result, and finally form a loss assessment report using the marked results;

wherein a determination is made as to whether a data collection target is global data collection or detailed data collection according to needs; in response to determining that the data collection target is the global data collection, the unmanned aerial vehicle is configured to be controlled to fly at a relatively high altitude, collect global image data, and feed it back to the background; and in response to determining that the data collection target is the detailed data collection, the unmanned aerial vehicle is configured to be controlled to fly at a relatively low altitude, collect detailed image data, and feed it back to the background.

7. A computer device comprising a memory and a processor, the memory storing a computer program that when executed by the processor causes the operations of the method of claim 1.

8. The computer device of claim 7, wherein the operation S3 comprises:

S31: determining whether a recognition type is global recognition or detailed recognition according to the needs of operation S2 and the collected image data;

S32: in response to determining that the recognition type is the global recognition, making a preliminary judgment based on the global image data whether there is a damage, and in response to determining that there is a damage, determining that the housed needs to be assessed for damage, and returning to operation S2 for detailed data collection; otherwise in response to determining that there is no damage, ending the loss assessment; and S33: in response to determining that the recognition type is the detail recognition, performing classification training on the damage points according to the detailed image data, weighting classification training results, and ranking according to an accuracy of automatic recognition.

9. The computer device of claim 8, wherein the operation S4 comprises:

S41: adding or deleting a damage mark on a damage point by a user according to the user's own judgment according to the recognition results, wherein the mark of the damage type comprises hail damage, wind damage, mechanical damage, and a plurality of aging and wearing damages.

10. The computer device of claim 8, wherein the operation S4 further comprises:

S42: adding a screenshot for each damage point, when the marks are completed, automatically taking screenshots of all damages while saving the marks, and automatically selecting a plurality of screenshots according to a matching degree between a type of damage and a type of claim; if another screenshot is still needed to be added, using a screenshot tool to manually take a screenshot and adding it by the user.

11. The computer device of claim 8, wherein the operation S4 further comprises:

S43: a virtual test box function, in which an insurance company's standard for settlement of a claim comprises checking whether there are more damage points than a preset value within a preset area, and according to measurements the virtual test box function is provided in a complete loss report, where the number of damage points in the box is marked.

12. A non-transitory computer-readable storage medium having stored therein a computer program, which when executed by a processor causes the operations of the method of claim 1.

13. The computer-readable storage medium of claim 12, wherein the operation S3 comprises:

S31: determining whether a recognition type is global recognition or detailed recognition according to the needs of operation S2 and the collected image data;

S32: in response to determining that the recognition type is the global recognition, making a preliminary judgment based on the global image data whether there is a damage, and in response to determining that there is a damage, determining that the housed needs to be assessed for damage, and returning to operation S2 for detailed data collection; otherwise in response to determining that there is no damage, ending the loss assessment; and S33: in response to determining that the recognition type is the detail recognition, performing classification training on the damage points according to the detailed image data, weighting classification training results, and ranking according to an accuracy of automatic recognition.

14. The computer-readable storage medium of claim 13, wherein the operation S4 comprises:

S41: adding or deleting a damage mark on a damage point by a user according to the user's own judgment according to the recognition results, wherein the mark of the damage type comprises hail damage, wind damage, mechanical damage, and a plurality of aging and wearing damages.

15. The computer-readable storage medium of claim 13, wherein the operation S4 further comprises:

S42: adding a screenshot for each damage point, when the marks are completed, automatically taking screenshots of all damages while saving the marks, and automatically selecting a plurality of screenshots according to a matching degree between a type of damage and a type of claim; if another screenshot is still needed to be added, using a screenshot tool to manually take a screenshot and adding it by the user.

16. The computer-readable storage medium of claim 13, wherein the operation S4 further comprises:

S43: a virtual test box function, in which an insurance company's standard for settlement of a claim comprises checking whether there are more damage points than a preset value within a preset area, and according to measurements the virtual test box function is provided in a complete loss report, where the number of damage points in the box is marked.

\* \* \* \* \*